(12) United States Patent
Ronen et al.

(10) Patent No.: US 8,939,025 B2
(45) Date of Patent: Jan. 27, 2015

(54) ADAPTIVE MODIFICATIONS IN MICRO OPTO-ELECTRO-MECHANICAL SYSTEMS

(75) Inventors: Aviv Ronen, Haifa (IL); Segev Ben Itzhak, Kyriat Bialik (IL); Lior Kogut, Haifa (IL)

(73) Assignee: Rafael Advanced Defense Systems Ltd, Haifa (IL)

( * ) Notice: Subject to any disclaimer, the term of this patent is extended or adjusted under 35 U.S.C. 154(b) by 380 days.

(21) Appl. No.: 13/514,051

(22) PCT Filed: Dec. 14, 2010

(86) PCT No.: PCT/IB2010/055789
§ 371 (c)(1),
(2), (4) Date: Jun. 6, 2012

(87) PCT Pub. No.: WO2011/073891
PCT Pub. Date: Jun. 23, 2011

(65) Prior Publication Data
US 2012/0272733 A1 Nov. 1, 2012

(30) Foreign Application Priority Data
Dec. 14, 2009 (IL) .......................................... 202712

(51) Int. Cl.
G01C 19/56 (2012.01)
G01C 19/5755 (2012.01)
G01C 19/5726 (2012.01)

(52) U.S. Cl.
CPC ........ *G01C 19/5755* (2013.01); *G01C 19/5726* (2013.01)

USPC .......................................................... 73/504.12

(58) Field of Classification Search
USPC .......................................................... 73/504.12
See application file for complete search history.

(56) References Cited

U.S. PATENT DOCUMENTS

| | | | |
|---|---|---|---|
| 6,350,983 B1 * | 2/2002 | Kaldor et al. | 250/231.1 |
| 6,510,737 B1 * | 1/2003 | Hobbs | 73/504.12 |
| 7,071,594 B1 | 7/2006 | Yan et al. | |
| 7,091,715 B2 * | 8/2006 | Nemirovsky et al. | 73/514.26 |
| 2006/0016259 A1 * | 1/2006 | Smith | 73/504.02 |

FOREIGN PATENT DOCUMENTS

| | | |
|---|---|---|
| EP | 070227 | 3/1996 |
| EP | 1189023 | 3/2002 |

* cited by examiner

*Primary Examiner* — Hezron E Williams
*Assistant Examiner* — Mark A Shabman
(74) *Attorney, Agent, or Firm* — Mark David Torche; Patwrite LLC

(57) ABSTRACT

A micro-opto-electromechanical rotation rate sensor (MO-ERRS) device, in which a rotation rate sensor is associated with peripheral circuitry. The magnitude of the output signal of the MOERRS is adaptable to correspond to a range of mechanical stimuli to which the sensor is sensitive, in order to accommodate the signal magnitude to the dynamic range available in the MOERRS device. The signal emanating from the rotation rate sensor is facilitated to exploit the dynamic range of said MOERRS device, by modifying some properties of one or more items on the MOERRS.

6 Claims, 4 Drawing Sheets

US 8,939,025 B2

ADAPTIVE MODIFICATIONS IN MICRO OPTO-ELECTRO-MECHANICAL SYSTEMS

FIELD OF THE INVENTION

The present invention relates to MEMS (micro-electromechanical systems) technology, in particular to MEMS employing optical micro-sensors for measuring rate rotation.

BACKGROUND OF THE INVENTION

Micro-electro-mechanical systems (MEMS) provide an electrical output in response to movement. MEMS are being incorporated in an increasing number of sensor and actuator devices especially in applications making use of orientation, alignment and stabilization such as medical devices, photographical equipment, transportation navigation and inertial sensors, and defense applications. MEMS are produced using several known microprocessing techniques, including: photolithography, wet etching, dry etching, physical vapor deposition, chemical-vapor deposition, oxidation, etc.

Micro-opto-electromechanical systems (MOEMS) constitute a special class of MEMS which involves sensing or manipulating optical signals using integrated mechanical and electrical systems.

Micro-electromechanical optical inertial sensing devices that measure rotation rate, typically make use of the Coriolis effect to detect rotation rate. U.S. Pat. No. 6,350,983, the contents of which are incorporated herewith by reference, discloses such a micro-machined optical inertial sensing device (sensor) in which a MEMS proof mass is suspended on cantilevers. U.S. Pat. No. 7,071,594 discloses a MEMS scanning device which is another application of optical MEMS.

SUMMARY OF THE INVENTION

The present invention is implemented in the framework of a specific type of electro opto-mechanical rotation rate sensing system, which is a rotation rate measuring system, the basic structure of which is described in U.S. Pat. No. 7,091,715, and the details of which are incorporated herein by reference. In brief, a proof mass hanging on beams is installed on top of a VLSI circuit such that the movement of the proof mass is not impaired. A mechanism is provided for driving the proof mass as known in the art. Any change in the mechanical forces acting on the sensor would create a response on the otherwise predicted motion of the proof mass. The movement of the proof mass is monitored by an array of light sensitive photo-detectors attached to the VLSI component, as the shade affected by the proof mass, masking the light of an illumination source, changes in coverage in one or more dimensions, in a time dependent fashion.

The motivation of the invention is to better exploit the dynamic range of the hardware infrastructure provided by the optical electro-mechanical rotation sensor on board the MOEMS in conditions of varying input signal level. Accordingly, such a sensor together with its circuitry can be adapted before the mission or modified autonomously during a mission to a specific range of mechanical stimuli, to optimally exploit the available dynamic range and thereby enhance the performance of the microdevice. The specific MOEMS in which the present invention is implemented will be referred to as Micro-opto-electromechanical rotation rate sensor (MOERRS).

BRIEF DESCRIPTION OF THE DRAWINGS

The invention may be understood upon reading of the following detailed description of non-limiting exemplary embodiments thereof, with reference to the following drawings, in which.

DETAILED DESCRIPTION OF EMBODIMENTS OF THE INVENTION

The output signal (in volts) of a Micro-opto-electromechanical rotation rate sensor (MOERRS) device in which the invention is implemented, is referred to hereinafter as $V_{sense}$. This output signal is related to the mechanical rotation observed by the sensor, and can be described as relating generally to several variables, in the following equation [1]:

$$V_{sense} = f(G_{electronic}, G_{optical}, G_{mechanical}, Y_{exc}, \Omega_{rate})$$

Where: $G_{electronic}$ is the electronic gain $G_{optical}$ is the optical gain, $G_{mechanical}$ is the mechanical gain $Y_{exc}$ is the mechanical excitation $\Omega_{rate}$ is the value of the input signal, in rotational units of the sensor.

In accordance with the present invention, some components of a MOEMS are made such that pre-mission modifications can be made to adapt the MOEMS to a specific range of mechanical rotation values expected to occur within the mission; and within-mission modifications can be made to adapt the MOEMS to changing mechanical rotation value ranges within the mission. As implied by the above equation, the output signal value (in volts) can be adapted to within limits of the dynamic range by implementing several discrete control loops in the MOEMS, to optimally exploit the dynamic range of the MOERRS.

1. The Mechanical Adaptation

Figure 1:
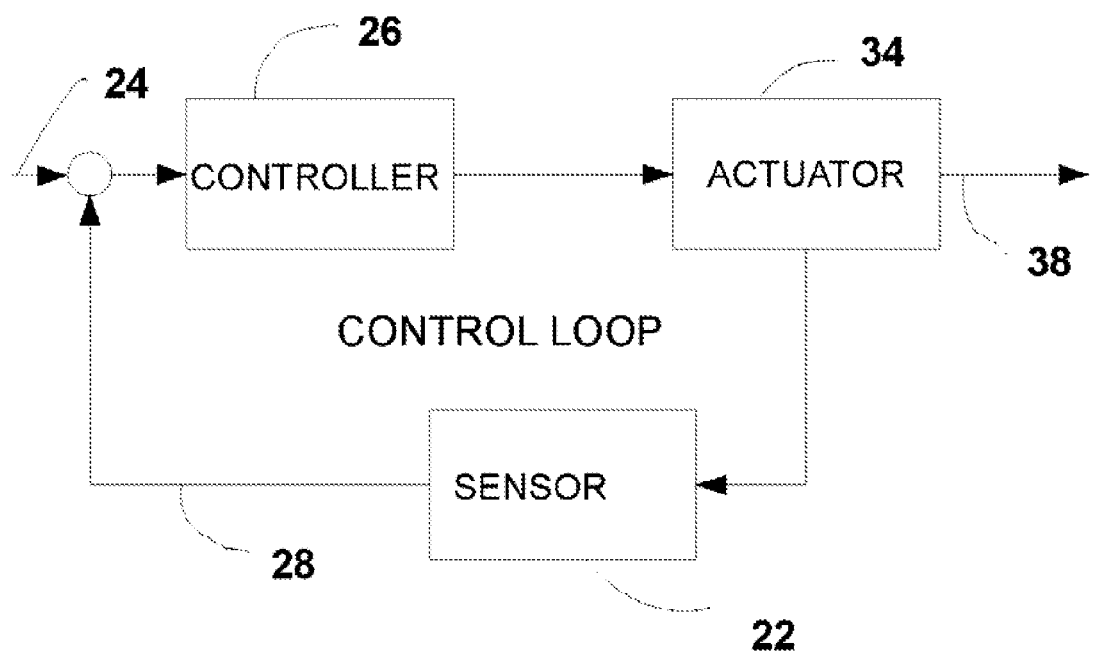
FIG. 1 is a schematic illustration of a mechanical control loop for the dynamic adaptation of the output signal of a MOEMS device according to an embodiment of the invention.

In general, the output mechanical signal of a MOERRS, is a product of the cyclical excitation signal. Thus, in order to increase the output signal, an increase in the excitation rate (i.e. the excitation signal) is affected, thereby providing higher signal values in the output of the sensor. The lower the input rotation signal is, the higher the excitation rate to be applied is in order to bring the output signal to a specific optimal range of values. In order to adapt the MOERRS pre-mission, a specific excitation rate value is to be selected in order to accommodate the expected output values of the sensor to the available dynamic range. Within-mission adaptation requires the implementation of a control loop that controls the excitation rate by adaptively changing the excitation range. Although somewhat obvious to a person skilled in the art of control mechanisms, it is explained with reference to FIG. 1. In the control loop described in the drawing, sensor 22 sends output signal that is compared to reference signal 24. Controller 26 takes in the difference between the reference signal 24 and the output signal 28 of sensor 22 effectively changing the torque or force applied by actuator 34 to the proof mass. Output signal 38 then typically positively correlates with the excitation mechanics to either increase or decrease, to fit in a desired value range.

2. The Electronic Control (Loop)

In combination with the above mechanical control mechanism or without such linkage, modifications in the electronic circuitry level can be used to bring the output signal of the sensor to such a range of values as to exploit the given dynamic range of the MOEMS device. The MOERRS which is implemented in a VLSI chip containing also additional elements, and peripheral circuitry disposed besides the MOERRS which supports the VLSI, for example accepting the amplified varying signal and amplifying it and conditioning it further. In accordance with the present invention, the output signal of the sensor is modified either on the VLSI chip or within the peripheral circuitry to accommodate the signal to appropriate ranges, to exploit the given dynamic range under a range of mechanical stimuli.

Peripheral Circuits Adaptation

Figure 2A:
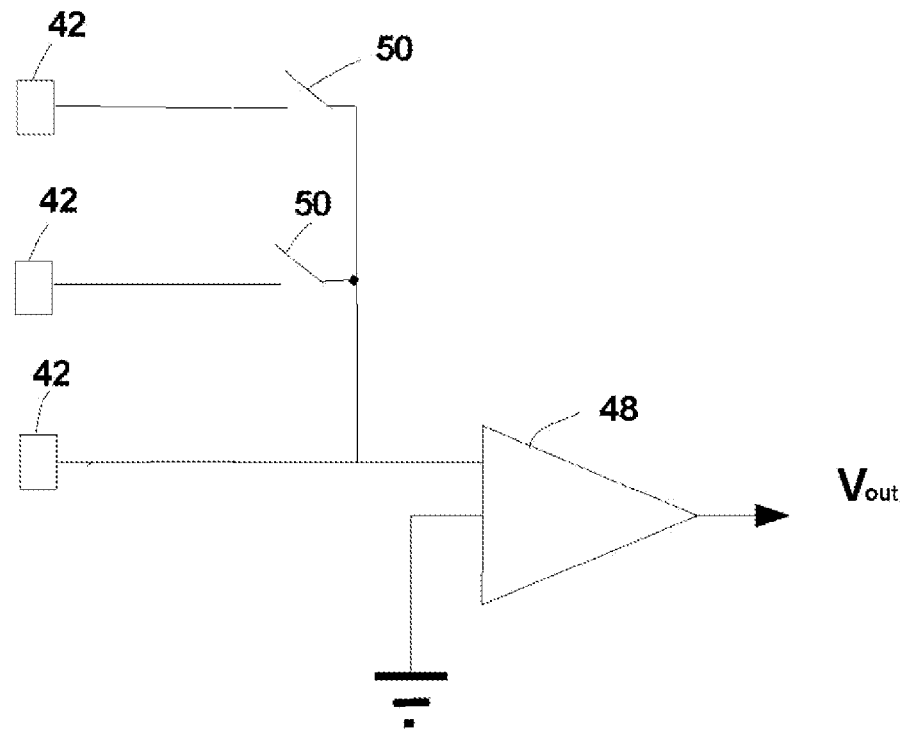
FIG. 2 is an illustration of a configuration of on/off switches disposed between the MOEMS device and the peripheral circuitry, in one embodiment of the invention.

The optical sensor on the VLSI chip, includes typically an array of photo detectors (typically photodiodes). Each such photo detector or some of them is connected to a switch and can be switched on or off. As can be seen in FIG. 2A to which reference is now made, photo sensitive cells 42 on the VLSI feed current through amplifier 48. Switches 50, separating each between a photo sensitive cell 42 and amplifier 48 are controlled by a controller, not shown, which can switch on or off a number of photo-sensitive cells. As more cells are switched off, less current arrives at summation amplifier 48.

Figure 2B:
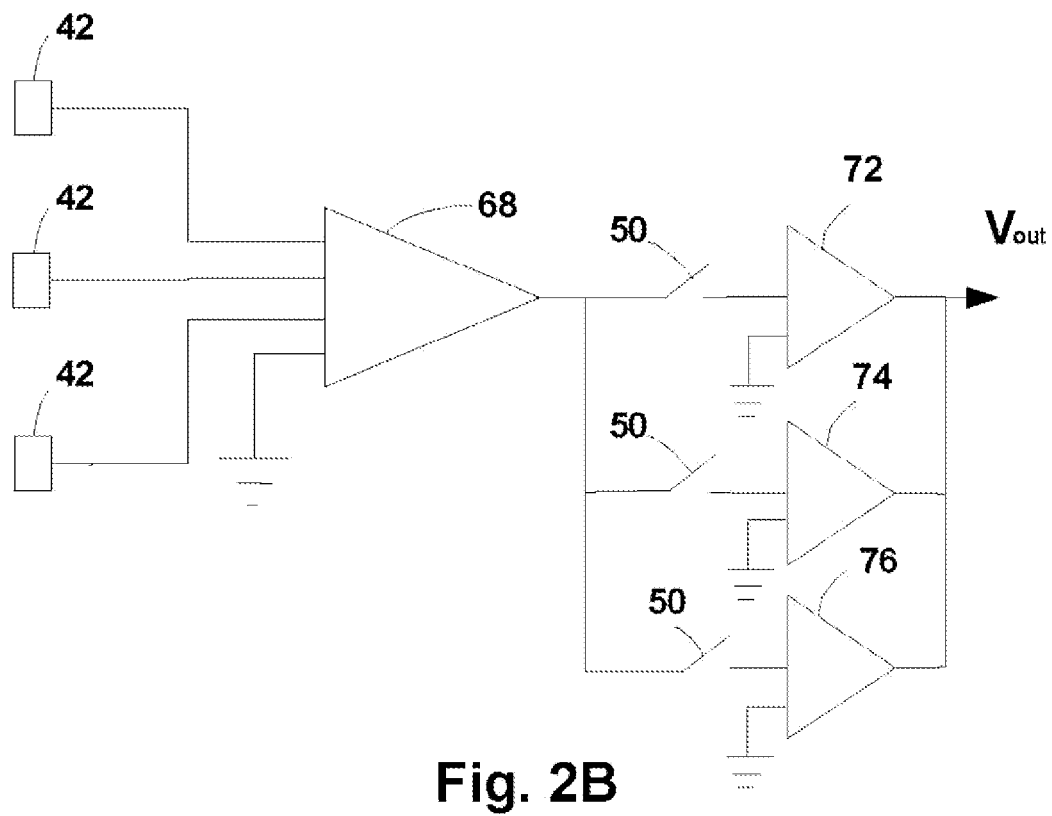
Figure 2C:
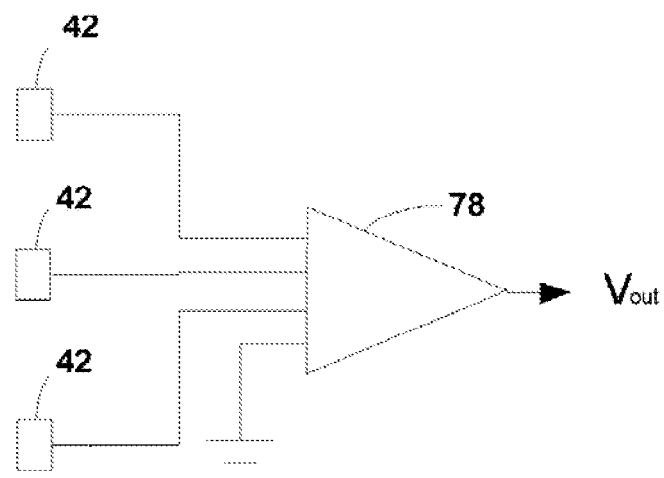

In another embodiment of the invention, described in a scheme in FIG. 2B, trans-impedance amplifier 68 which is installed as a component in the peripheral circuitry and functioning as a current to voltage conversion means, receives current from photocells 42. Switches 50, separating each between trans-impedance amplifier 68, and amplifiers 72, 74 and 76, are controlled by a controller, not shown, so that they can be individually or in groups, turned on or off. Thus when the signal received by trans-impedance amplifier 48 is high, the controller mentioned above can turn off some of switches 50, selecting an appropriate amplifier to bring the output signal ($V_{out}$) to a more desirable value. In another embodiment, described schematically in FIG. 2C, photo sensitive cell 42 on the VLSI feed a trans-impedance amplifier 78, and the controller not shown, selects the appropriate amplification to get the appropriate voltage out of the amplifier.

On-VLSI Amplification Adaptation

Figure 3:
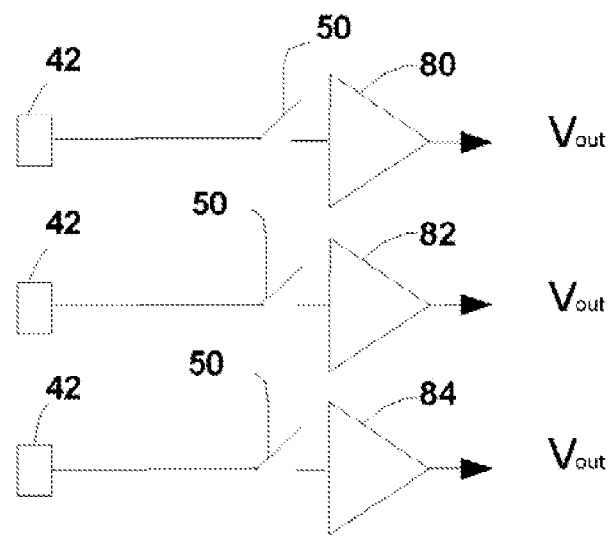
FIG. 3 is a schematic illustration of a configuration of on/off switches disposed between the MOEMS device of the invention and the peripheral circuitry, according to another embodiment of the invention.

On the VLSI, respective amplifiers that receive current from the various photo sensitive elements of the photo sensitive detectors array are monitored individually. As can be seen in FIG. 3, to which reference is now made, photo sensitive cells 42, on the VLSI feed current to respective amplifiers 80, 82 and 84 on the VLSI as well. The controller, monitoring each amplifier individually, can select a certain specific amplifier which sends out current high enough for the actual processing of the rotation data, yet is below its saturation level, and in parallel turn off all or some of the other amplifiers. This way, the signal from the sensor can be manipulated to be kept within a specific range, with fewer amplifiers employed and no trans-impedance amplifier employed as in the example described above, presenting a noise-reduced implementation of signal amplification control.

3. The Optical Control (Loop)

Figure 4A:
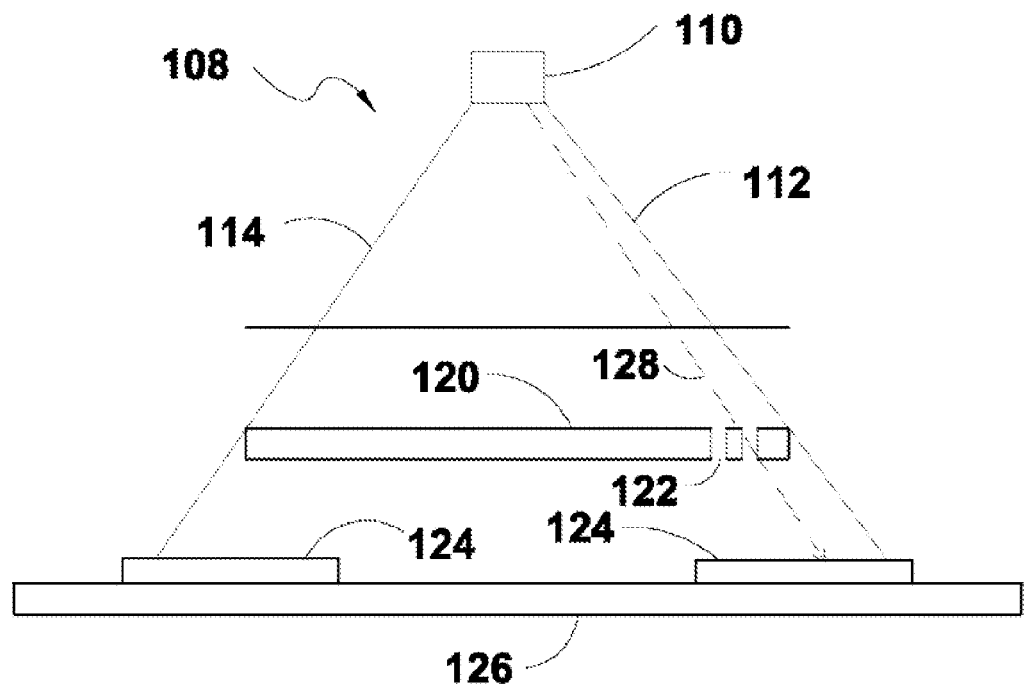
FIG. 4A is a schematic sectional view of the MOEMS device of the invention illustrating structured perforations in the proof mass.

The light impinging on the optical sensor array, causes the ejection of electrons from the photo-sensitive portions of the detectors, creating a current that relates to the mechanical stimulus, and therefore can be used to measure the mechanical stimulus affecting the MOEMS. To enable the MOERRS and the MOEMS in general to exploit its full dynamic range for the measurement of the mechanical stimulus, the current/ impinging light ratio can be changed in several ways. As can be seen in FIG. 4A to which reference is now made, a schematic cross section in a MOERRS generally representing a sensor device in which the invention is implemented 108, is shown. Illumination source 110 typically a LED, sheds a light beam, the effective boundaries of which are marked by lines 112 and 114 respectively. Proof mass 120 contains through slits or holes of various shapes such as slit 122 that allow increased light penetration to one or more of the photo sensitive arrays 124, disposed on VLSI 126, as indicated by light ray 128.

Figure 4B:
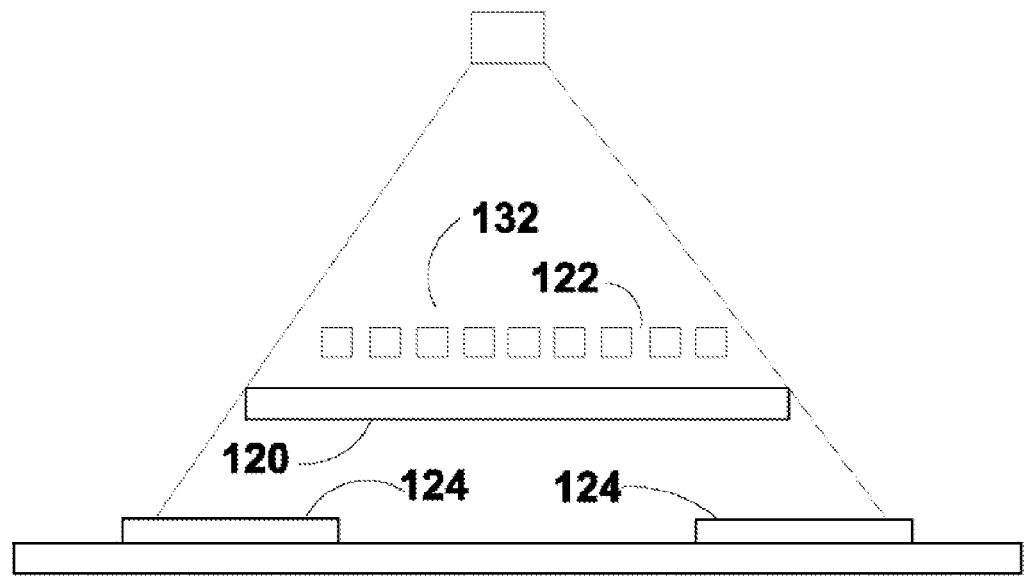
FIG. 4B is a schematic sectional view of the MOEMS device of the invention illustrating structured perforations in a dedicated plate facing the VLSI.

Such slits are possibly implemented by adding to the MOEMS architecture a perforated plate as can be seen in the scheme shown in FIG. 4B. In this example perforated plate 132 is located above proof mass 120, but it can be alternatively disposed below the proof mass. Although not shown, in such cases the proof mass may be perforated as well, in order let sufficient light pass through it. To complement the use of perforations, shutters are applied to shut off the perforation/ slits, typically selectively, blocking the light that reaches the photo sensitive array. By controlling the number and or the degree of closure of such perforations, the amount of light impinging on the photo sensitive array.

Pre-mission adjustment of the MOEMS can take into account the expected magnitude of the mechanical stimuli expected in the mission. For higher the expected stimuli, more shutters can be closed allowing for less light to reach the photo-sensitive arrays. Vice versa, for missions in which mechanical stimuli of lesser magnitude are expected, more exposure is to be effected. Within-mission control loop of exposure to the photo sensitive array can be effected by measuring the signal of the MOERRS and responding by shutting available perforations if signal is too high, and vice versa. A variety of perforation closure control embodiment can be effected by superimposing LED screens over respective perforations, so that shutting can be implemented by turning on LED photodiode disposed over a perforation, such that the pigmentation formed reduces the amount of light penetration through the respective perforation.

What is claimed is:

1. A MOEMS device for measuring rate of rotation in which energy in the form of light is converted to electric current by photo sensors, which produce an output signal, the magnitude of the output signal of said photo sensors is manipulated by a time dependent light masking effect of a moving proof mass of a micro-opto-electromechanical rotation rate sensor (MOERRS) and the output signal can be adapted to correspond to a range of mechanical stimuli to which said MOERRS is sensitive, in order to accommodate the signal magnitude to the dynamic range available in the context of said MOERRS, said MOERRS comprising:
   the moving proof mass;
   an actuator for mechanically exciting said proof mass;
   an illumination source illuminating at least said proof mass;
   at least one array of photo-sensitive cells disposed on a VLSI, facing said proof mass, and wherein said VLSI includes circuitry for processing the output signal emanating from said MOERRS; and peripheral circuitry, disposed beside said MOERRS device;

wherein said output signal emanating from said MOERRS is adaptable to facilitate exploitation of the dynamic range of said MOERRS device, by modifying properties of elements on board said MOERRS device, said modification including changing properties of at least one item selected from the group containing: amount of illumination impinging said photo sensitive cells, amplification of the signal emanating from said photo sensitive cells and the change of the force applied by an actuator exciting said proof mass.

2. The device as in claim 1 wherein said device employs a controller configured to be capable of adapting the number and identity of amplifiers of current fed from said photosensitive cells on said VLSI, by switching on or off said photosensitive cells, to select a certain photosensitive cell or a plurality thereof to bring the output signal of said MOEMS to a more desirable value.

3. The device as in claim 1 further comprising a plate blocking some of the light impinging said at least one array of photo sensitive cells is perforated, said perforations being selectively blocked by shutters controlling the amount of illumination impinging said at least one array of photo sensitive cells.

4. The device as in claim 3 wherein said proof mass is perforated.

5. The device as in claim 1 wherein said modifications of said properties of elements on board said MOERRS device are carried out pre-mission.

6. The device as in claim 1 wherein said modifications of said properties of elements on board said MOERRS device is carried out within-mission.

\* \* \* \* \*